Dec. 21, 1965  R. B. WETLESEN  3,224,670
LITTER BASKETS
Filed Dec. 19, 1962  2 Sheets-Sheet 1

INVENTOR:
ROBERT B. WETLESEN.

Dec. 21, 1965 R. B. WETLESEN 3,224,670
LITTER BASKETS
Filed Dec. 19, 1962 2 Sheets-Sheet 2

United States Patent Office 3,224,670
Patented Dec. 21, 1965

3,224,670
LITTER BASKETS
Robert B. Wetlesen, Starefossvingen 19, Bergen, Norway
Filed Dec. 19, 1962, Ser. No. 245,770
Claims priority, application Norway, Jan. 4, 1962,
142,749
3 Claims. (Cl. 232—43.1)

This invention relates to litter baskets and, in particular, to litter baskets of the kind suitable for permanent erection and use in public places which comprise a container, fastening means for securing the container to a support such as, for example, a house wall, post or the like, supporting means for removably and replaceably mounting a poster-bearing plate on an outer face of the container thereby enabling the poster to be exhibited and locking means which locks an emptying arrangement and the poster-bearing plate to the container.

The emptying arrangement can be in the form of a detachable inner basket which facilitates collection and subsequent removal of litter from the litter basket. However, the employing of an inner basket requires that the litter basket be constructed with a fairly large opening so that the inner basket may be readily withdrawn and reinstalled. In consequence, mounting of the inner basket is made rather difficult and, moreover, the design of a really strong litter basket presents something of a problem. This is particularly the case with openings which face upwardly or laterally.

An object of the invention is to provide a litter basket wherein the use of the inner basket is avoided, but at the same time the locking of the poster-bearing plate and the emptying arrangement of the container can be combined.

According to the present invention there is provided a litter basket of the kind referred to in the preceding paragraph which comprises an emptying arrangement in the form of a door or like closure means which gives access to the interior of the container, and is disposed at the lower end of the container, so that on opening the closure means the contents of the container slide out by virtue of their own weight and can be collected in a suitable transportable emptying device arranged at the under side of the container.

With such a device it is possible for the one who empties the container to avoid altogether coming into contact with the contents of the container, so that, for example, dirtying of the advertising posters to be installed in the container is largely avoided. With the known type of litter basket, however, it could happen that the inner basket is so full that it is difficult to get hold of hand grips in the inner basket without dirtying oneself on the contents at the same time, and in addition, it has often proved unavoidably troublesome having to pick out small pieces of refuse gathered together in the outer container outside the inner basket which can prevent the inner basket from being installed in the intended way in the outer container.

Furthermore, the present form of litter basket has enabled a container to be made having a simple and, at the same time, rigid construction and which also permits the contents of the container and the openings for admission of litter and the like to be shielded in an advantageous manner. In a further development the container is provided with a top panel which while spanning the top of the container and thereby shielding the contents from rain and snow, can serve as a reinforcement for the container at its top. Such a container is provided with openings for admitting litter and the like, preferably laterally arranged just below the top panel. By shielding the contents of the container from rain and snow one can minimize dirtying of the interior of the container thereby facilitating emptying and consequently the risk of dirtying the advertising poster during the possible subsequent replacement of an advertising poster is also reduced.

So that one may reduce the possibilities of dirtying the advertising posters in this manner, it is possible according to the invention to utilize an advertising poster consisting of a replaceable sheet of paper or the like which can be fixed so as to be easily removable on the rear side of a transparent sheet of glass or suitable plastic, which shields the advertising sheet from the weather and wind.

In order that the invention can be more clearly understood, a convenient embodiment thereof will now be described, by way of example, with reference to the accompanying drawings in which.

Figure 1:
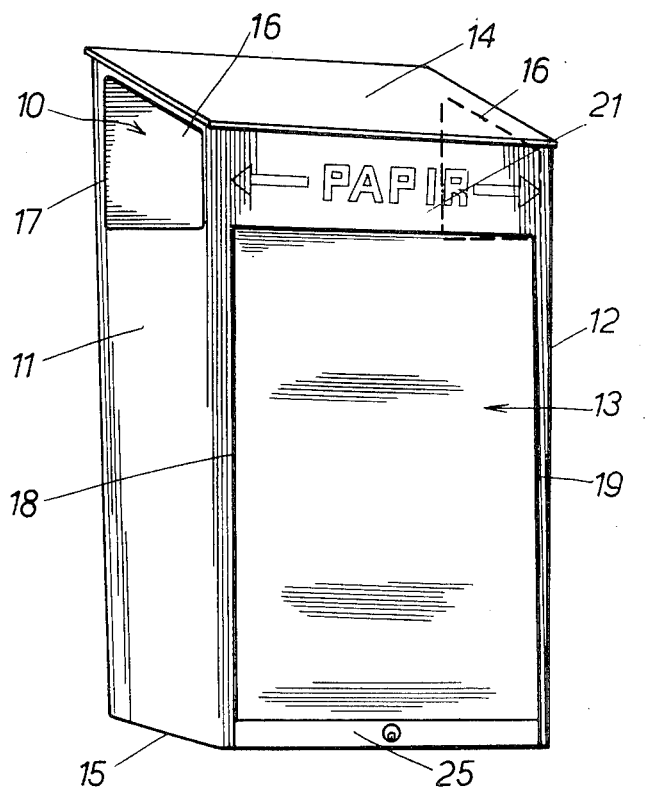
FIGURE 1 shows a litter basket constructed in accordance with the invention as seen in perspective from the front.

The litter basket which is illustrated in FIG. 1 consists of a comparatively well-shielded container of metal plate construction, wherein the individual plate members are spot welded to one another. The container can be secured to a post, house wall or the like with fastening means (not shown). The container generally consists of a back part 10, two side parts 11 and 12 and a front part 13, together with a top part 14 and a bottom part 15, preferably perforated.

The back part 10 is formed integrally with side parts 11 and 12. At the top of the side parts 11 and 12, just below the top part 14, there are formed admission openings 16 for depositing litter and the like in the basket. Around the openings 16 the side parts 11 and 12 are provided with pressed-in, inwardly bent edge portions 17, so that rounded connecting portions to the interior of the container are formed. These inwardly bent edge portions will also serve to reinforce the side parts. The side parts 11 and 12 are terminated along the side edges by corners 18, 19 and just behind the corners 18, 19 there is fixed an inner wall 20 which so to say extends across the entire front part of the container. Between the inner wall 20, the corners 18, 19 and an upper front strip 21 there is formed a guide 22 for the removable and replaceable reception of a poster-bearing plate 23 which is pushed into the guide 22 from below.

The poster-bearing plate 23 may consist of a rigid, clearly transparent sheet of plastic, while on the rear side of the plate there is located a sheet of paper 24 or the like which has, for example, advertising matter printed thereon. The paper sheet 24 need not necessarily be fixed to the plate 23, but can, for example, be only turned down over the top edge of the plate, and the turned-over portion of the paper sheet can be concealed in the guide between the strip 21 and the inner wall 20, when the plate is fully pushed into the guide 22. By pushing the plate 23 into the guide 22 from below the paper sheet is shielded behind the plate 23, so that moisture is prevented from penetrating to the rear side of the plate 22 and destroying or spoiling the advertising poster.

The back part 10, the side parts 11 and 12, and the front part 13 of the container are reinforced by their connection with the top part 14. The top part 14 extends slantingly forwards and downwards to the front part 13, so that rain water and the like is led away from the openings 16 in the side parts 11 and 12. The top part 14 which covers the whole of the top of the container also projects partly outside the side parts of the container and the front part.

Figure 2:
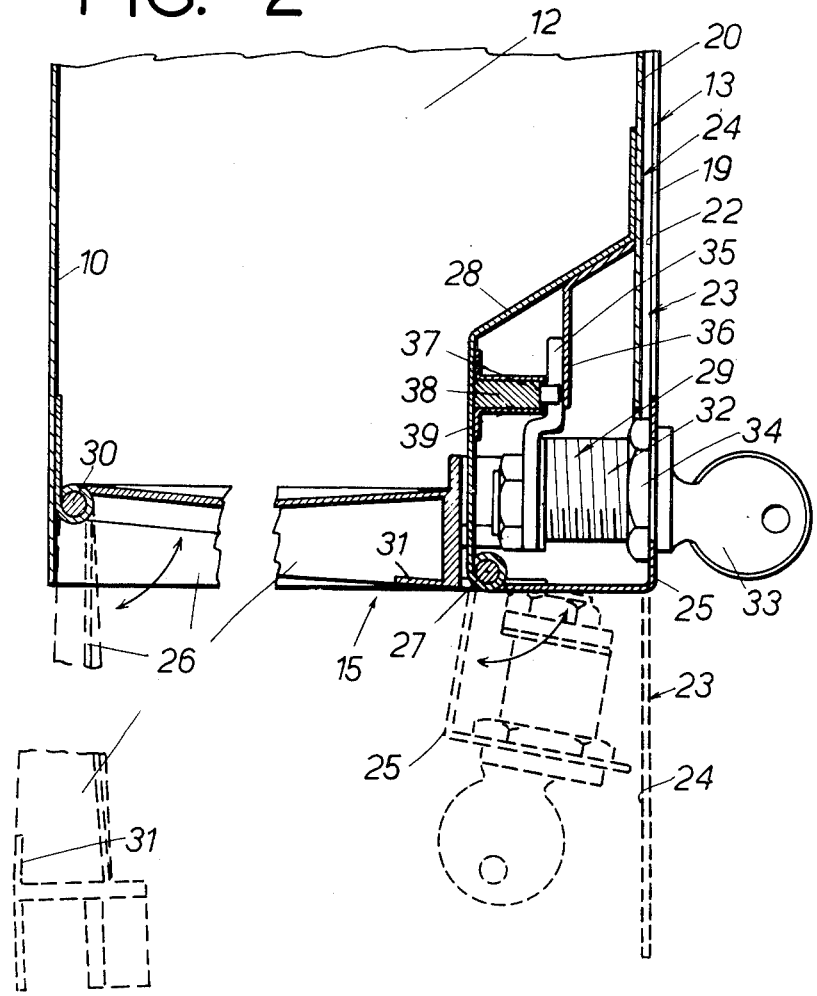
FIGURE 2 is a cross-section through the bottom portion of the litter basket.

The bottom part 15 of the container is divided into two parts, that is to say a closure or stop member 25 and a closure or emptying door 26 which gives access to the interior of the container from the bottom thereof. The closure member 25 has an angle-shaped cross-section and is pivotally mounted at the extreme end of one of the angle arms about an axis 27 which extends across the bottom of the container at the lower end of a partition wall 28. In the space between the partition wall 28, the inner wall 20 and the angular closure member 25, a locking arrangement 29 for the closure member 25 of the container and door 26 is located, so as to be shielded both from the outside and from the interior of the container. At the same time as the partition wall 28 shields the locking arrangement from the contents of the container the partition wall is able to form a lower reinforcement for the container. The closure member 25 is as shown in FIG. 2 pivotable from a closed position as shown in full lines to an open position as shown in dotted lines. In the first-mentioned position the advertising poster is locked in place in an intended manner and in the swung-out position shown replacement of the advertising poster is permitted. The closure 25 thereby constitutes a releasable supporting means for the poster plate. The door 26 is pivotally mounted about an axis 30 at the lower end of the back part 10 and can be pivoted from this position which is shown in full lines to the position which is shown in dotted lines. In the first-mentioned position, the door for the contents of the container is closed by means of the locking arrangement 29 which will be further described below. After this locking arrangement has released the locking arrangement with the door 26, the door will normally fall open to the position shown in dotted lines. Thereby the door 26 constitutes an emptying arrangement for the container. If the door for one reason or the other should be caught, the door can be raised up by hand after it has been freed, by gripping a finger grip 31 at the front edge of the door.

Figure 3:
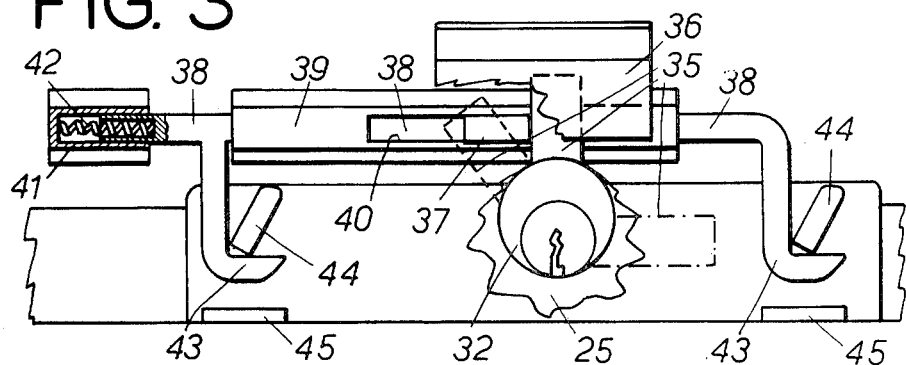
FIGURE 3 shows the locking arrangement as seen from the front side of the litter basket, individual parts being broken away for the sake of clarity.

The locking arrangement 29 of the container is provided with a lock 32 of the lock type having a removable key 33. The lock 32 is secured by means of a nut 34 to the angle arm of the closure member 25 having a free end. Catch 35 of the lock 32 is designed as a radial outwardly projecting part which in the normal position of the lock, in which the key can be removed from the lock, extends vertically upwards, as is shown in full lines in FIG. 3. As is shown in FIGS. 2 and 3, the lock catch 35 in this position lies locked on the rear side of a lock part 36 which is secured to and projects downwards from the partition wall 28. On turning the lock catch in clockwise direction to the position which is indicated in chain dotted lines in FIG. 3, the lock catch 35 will be guided out of engagement with the lock part 36 and thereby release the closure member 25. Thereby, the closure member 25 may be pivotally moved to the dotted position shown in FIG. 2 for removal and replacement of the plate 23.

In the position which is shown in full lines in FIG. 3 the lock catch 35 lies with a side edge thereof against a pin 37, which projects laterally outwards from a horizontally displaceable lock catch 38. The lock catch 38 is controlled for movement in a guide 39 which is secured to the partition wall 28. In the guide 39 there is provided a control slot 40 for accommodating the pin 37 and the control slot 40 has a length such that it will limit the horizontal movement of the lock catch 38 to the amount strictly necessary. At the left end of the catch 38 in FIG. 3 there is secured to the partition wall 28 a box 41 and in this box there is accommodated a compression spring 42 between the catch 38 and the bottom of the box, so that the catch 38 will normally be urged towards the full-line position which is shown in FIG. 3, in order that the lock catch 38 will constantly be able to bear against the lock catch 35 of the lock 32. At each end of the catch 38 there extend, first vertically downwards and thereafter horizontally from left to right in FIG. 3, locking hooks 43 which lock with respective locking means 44, which are secured to the door 26, by engaging the under side of locking means 44. In order to open door 26, the key 33 is turned counter-clockwise to turn the catch 35 counter-clockwise against the action of spring 42. The catch 38 will be displaced by catch 35 and when the hooks 43 on the catch 38 are free of the locking means 44 the door 26 is free to open downwardly under its weight and the weight of the contents in the container. In order to permit the door 26 to be shut with the lock 32 in the normal position the lower edges of the locking hooks are inclined from below and upwards and outwards and the locking means 44 are arranged correspondingly inclined upwards and outwards. Thereby, the locking means 44 will cause the catch 38 to be displaced to the left in FIG. 3 against the action of spring 42 when the door 26 is being closed. In order to prevent the door 26 from being unintentionally pushed too far into the container, stop parts 45 are placed on the door 26 just below the locking means 44, so that the locking hooks can be pushed into the locking position between the locking means and the stop part thereby securing the door in place in the locked position.

In order to close the door 26, the closure member 25 must necessarily be guided to the position which is shown in full lines in FIG. 2 and the lock 32 must be set in the normal position with the lock catch 35 bearing against the lock catch 38. In this way it can be ensured that the door 26 cannot be opened unintentionally during replacement of the advertising poster, while one does not necessarily need to empty the litter basket every time the advertising poster is replaced, even if this is ofen preferred. At the same time one need not open the closure member 25 for the advertising poster for each time that the contents of the container are emptied. Thus the basket may be selectively emptied or the poster replaced each independently of one another.

What I claim is:

1. A litter basket comprising a container, a poster-bearing plate, supporting means for removably and replaceably mounting the poster-bearing plate on an outer face of the container thereby enabling a poster mounted on said plate to be exhibited, an emptying arrangement for the container and locking means which locks the emptying arrangement and secures the poster-bearing plate in the container, said emptying arrangement comprising a closure door which provides access to the interior of the container and is pivotally disposed at the lower end of the container, so that on opening the closure door, the contents of the container slide out by virtue of their own weight for collection at the under side of the container, the locking means including a lock, a removable key for said lock, first lock means releasably engaging the closure door in locked position, second lock means releasably engaging the poster-bearing plate in the container and lock catch means on the lock and cooperating with said first and second lock means for releasing the closure door when the key is turned in one direction in the lock, and for releasing the engagement of the poster plate when the key is turned in the other direction in the lock.

2. A litter basket comprising a container, a poster-bearing plate, supporting means for removably and replaceably mounting said poster-bearing plate on an outer face of the container thereby enabling a poster mounted on the poster-bearing plate to be exhibited, an emptying arrangement for the container and locking means which locks said emptying arrangement and the poster-bearing plate in the container, said emptying arrangement comprising a closure door which provides access to the interior of the container and is pivotally disposed at the lower end of the container, so that on opening the closure door the contents of the container slide out by virtue of their own weight for collection at the under side of the container, the locking means including a lock, a removable key for said lock, lock means supported from said container for releasably engaging the closure door in locked position, and a lock catch member on said lock and rotatable with said key, said lock catch member having a lock position in which the lock catch member locks the supporting means for the poster plate in a position in which the poster plate is exhibited, said lock means comprising a displaceable locking member engaged with the lock catch member such that upon turning the key and the lock catch member therewith in one direction the locking member is displaced and releases the lock means whereby the closure door is freed for opening, said lock catch member releasing the supporting means for the poster plate to enable removal and replacement of said poster plate upon turning of the key in the opposite direction in the lock.

3. A litter basket comprising a container, a poster-bearing plate, supporting means for removably and replaceably mounting said poster-bearing plate on an outer face of the container thereby enabling the poster to be exhibited, an emptying arrangement for the container and locking means which locks said emptying arrangement and the supporting means for the poster-bearing plate to the container, said emptying arrangement comprising a closure door which provides access to the interior of the container and is pivotally disposed at the lower end of the container, so that on opening the closure door the contents of the container slide out by virtue of their own weight for collection at the under side of the container, the locking means including a lock, a removable key for said lock, a spring-loaded lock catch member for the closure door, a lock catch for the poster-bearing plate and a locking member engageable with said poster-bearing plate lock catch, the lock catch member for the closure door being urged by virtue of its spring loading to a locking position for said closure door, said key on being turned resulting in the direct turning of the lock catch of the poster-bearing plate, said plate lock catch on being turned in one direction actuating the lock catch member for the closure door while remaining in engagement with said lock catch member so as to release said closure door, and on being turned in the other direction being released from engagement with said locking member whereby the supporting means for the plate member is released to enable removal and replacement of said poster plate, and locking means on the closure door for cooperating with the lock catch member for the releasable engagement of the closure door, said locking means and lock catch member being respectively shaped such that the said locking means can be brought into engagement with said lock catch member from the open position of the closure door to its closed and locked position.

References Cited by the Examiner

UNITED STATES PATENTS

| | | | |
|---|---|---|---|
| 577,452 | 2/1897 | Richardson | 232—43.3 |
| 746,906 | 12/1903 | Wilmer | 232—46 |
| 1,037,348 | 9/1912 | Smith et al. | 232—45 |
| 1,055,735 | 3/1913 | Gabel | 232—45 |
| 1,128,529 | 2/1915 | Ryland | 232—53 |
| 1,743,986 | 1/1932 | Thompson | 232—1.4 |
| 2,303,598 | 12/1942 | Alley | 232—43.1 |

FOREIGN PATENTS

| | | |
|---|---|---|
| 659,967 | 3/1963 | Canada. |

FRANK B. SHERRY, *Primary Examiner.*